REMOTE CATHODE FOLLOWER POWER AMPLIFIER WITH AUTOMATIC ADJUSTMENT OF TUNING AND LOADING

Filed July 1, 1963

INVENTORS
HENRY E. BRUNS
EDWIN M. STRYKER
BY Herbert F. Sommermeyer
ATTORNEY

# United States Patent Office 3,273,068
Patented Sept. 13, 1966

3,273,068

REMOTE CATHODE FOLLOWER POWER AMPLIFIER WITH AUTOMATIC ADJUSTMENT OF TUNING AND LOADING

Henry E. Bruns, St. Paul, and Edwin M. Stryker, New Brighton, Minn., assignors to Sperry Rand Corporation, New York, N.Y., a corporation of Delaware Filed July 1, 1963, Ser. No. 292,032
1 Claim. (Cl. 325—174)

This invention relates generally to the field of electrical communication systems. More particularly this invention is directed towards an improved power amplifying circuit for use in coupling the output of a radio frequency (RF) transmitter to a transmitting antenna.

In RF communication systems, and especially air-borne units and systems, in order to effect maximum or optimum transmission over a range of frequencies using an antenna having a fixed physical length, present day systems incorporate tuning circuits between the transmitter output and the antenna. Since the impedances change as the signal frequency is varied, the tuning circuits provide maximum power transfer betwen the transmitter and the antenna for each of the respective frequencies. These circuits, generally referred to as antenna coupler circuits, serve to match the effective impedance of the antenna, at the selected frequency, to that of the transmitter to effect the maximum power transfer therebetween. In general, the antenna impedance appears as a reactive load on the transmitter, either capacitive or inductive depending on the selected frequency. Since, in general, the antenna is remotely located from the transmitter, the amplified transmitter output of predetermined power level is coupled to the antenna via a transmission line. The output section of the transmitter includes a tuned circuit to optimize transfer of power to the transmission line. The tuning of this tuned circuit is determined by the load as seen by the transmitter, said load including the combination of the impedance of the transmission line, the antenna coupler circuit impedance and the antenna impedance. Between the terminal end of the transmission line and the antenna there is a further variable tuned circuit for matching the impedance of the load the antenna impedance, to the impedance of the source, which in this case is the output of the transmission line. It is an object of this invention to provide a circuit for coupling the output of a transmitter to an antenna requiring only a single tuned circuit.

In the prior art devices the transmitter had to provide an amplified output of sufficient power to overcome power losses in the transmission line while still providing the antenna with the required power output. A feature of this invention is that the transmission line is driven at a relatively low power level by an exciter circuit thereby substantially reducing losses in the transmission line.

Since the exciter provides a relatively low power output, the exciter output signal must be amplified prior to applying it to the antenna in order to achieve the desired power output from the antenna. It is a further feature of this invention to provide a power amplifying circuit configuration that presents a relatively constant impedance to an exciter output even though the effective impedance of the antenna changes as the signal frequency changes. Further the particular unique circuit configuration is such that the order of magnitude of power amplification is attained while still providing the power amplifier with power dissipation capabilities so that it may operate within its rated capacity.

The preferred embodiment of this invention, which will be subsequently described in greater detail, includes a vacuum tube power amplifer having at least a control grid, a cathode and an anode constructed with a vaned metallic radiator which is brazed to the anode for cooling purposes. The tube is connected in the cathode-follower circuit configuration with the relatively low power signal output from an exciter circuit being applied to the control grid through a transmission line. The amplified output, which is fed through a variable tuned circuit to the antenna, is obtained from the cathode circuit. The circuit is further arranged such that the cathode operates at a relatively large negative potential, in the order of —2,000 volts D.C., and the anode is grounded. This provides the required potential difference between the cathode and anode to achieve the power amplification of the signal input while still allowing for the radiator to be connected to the metallic casing of the equipment for additional cooling, if necessary, while safeguarding against the inherent danger of a high potential being exposed to human contact. The relatively high input impedance of a cathode-follower circuit configuration over the full range of signal frequencies provides a relatively constant load on the exciter circuit to effectively eliminate any requirement for a tuned circuit at the exciter output. Since the cathode-follower circuit configuration provides a high power gain, the exciter output is transferred over the transmission line at a relatively low power level to thereby minimize power loss through the transmission line. Because of the relatively low output impedance of the cathode-follower circuit, tuning of the coupling circuit for maximum power transfer between the cathode circuit and the antenna at the respective selected frequencies is readily effected. Additionally, the further inherent features of the cathode-follower circuit, such as negative feedback to improve frequency response and both input and output having one side grounded, are achieved.

These and other more detailed and specific objects and features will be disclosed in the course of the following specification, reference being had to the accompanying drawings, in which.

Figure 1:
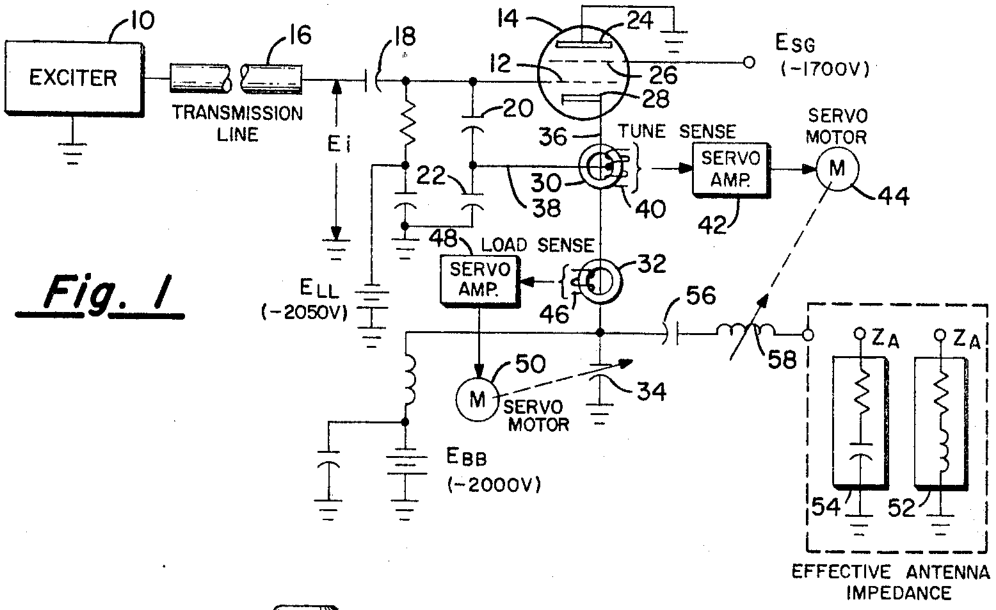
FIG. 1 is a circuit schematic of the preferred embodiment of this invention.

This invention is particularly adaptable for use in airborne communications equipment since the antenna is usually of a fixed physical length and also is generally remotely located from the transmitter. In FIG. 1, the exciter 10 has its output connected to the control grid 12 of vacuum tube 14 via the transmission line 16 and capacitor 18. Although not shown in the figure, it can be assumed that the frequency of the signal output of the exciter is variable over a predetermined range which may be, in a typical case, two to thirty megacycles. In the well-known manner, the A.C. signal input to the control grid is designated as $E_I$. The control grid is biased by the D.C. supply labelled $E_{CC}$ via a bias resistor in the well-known manner. The capacitor across the bias supply serves as a filter to keep the signal frequency out of the D.C. supply. The values shown for the D.C. energy sources $E_{CC}$ and $E_{BB}$ and $E_{SG}$ are intended to be illustrative only and not limitative, but do serve to give an indication of the general order of magnitudes of these supplies. These values and component values are selected in accordance with proper engineering design depending upon the selected vacuum tube and the particular circuit arrangement. A pair of capacitors, 20 and 22, are connected in series between the control grid 12 and a reference potential which is indicated in the well-known manner as ground. The purpose of this arrangement of the two capacitors will be subsequently described in greater detail but for the present they can be considered as providing an A.C. signal voltage divider while presenting a relatively high impedance to the input signal over the entire frequency range so as to present substantially no loading on the transmitter output. Anode 24 of the vacuum tube 14 is connected directly to the ground reference potential. The screen grid 26 is connected to a further D.C. energy source, $E_{SG}$, in the well-known manner. The vacuum tube circuitry is connected in the cathode-follower circuit configuration. Considering first the D.C. path of the cathode circuit, the cathode 28 is connected to D.C. energy source labelled $E_{BB}$ which is polarized negatively with the positive pole connected to the ground reference potential and the negative pole connected to the cathode. The capacitance-inductance combination in the cathode D.C. signal path provides filtering, in the well-known manner, to keep the A.C. signal out of the D.C. supply. The A.C. signal path of the cathode circuit includes a pair of RF transformers respectively labelled 30 and 32, in series with a variable capacitor, 34, between the cathode 28 and the ground reference potential. The RF transformers are represented by magnetic cores with associated windings. Conductor 36 inductively couples the cathode signal output to the RF transformers and is represented as a single turn primary passing through the aperture of the respective cores, no limitation to such an arrangement being intended. A further signal from the input to the amplifier is tapped from the capacitive voltage divider comprising capacitors 20 and 22 and is coupled through conductor 38 to RF transformer 30. An output sensing winding 40 on RF transformer 30 provides an input to servo amplifier 42 which in turn controls the operation of servo motor 44. In a similar manner, an output sensing winding 46 of RF transformer 32 provides an input to servo amplifier 48 which in turn controls the operation of servo motor 50. The latter is mechanically coupled to vary the capacitance of the variable capacitor 34. Depending on the selected signal frequency, the effective antenna impedance is either inductive or capacitive, as represented in FIG. 1 at 52 and 54 respectively. The signal output from the cathode is coupled to the antenna through capacitor 56 and variable inductor 58. The setting of the latter is positioned by mechanical operation of servo motor 44 and is indicated in the well-known manner by the dashed line.

In a typical aircraft installation, the excited 10 is located remotely from the antenna. By means not shown, the radio operator selects the desired signal frequency and the exciter outputs this signal to the transmission line 16. The value of capacitor 18 is selected so that it presents negligible impedance to the signal over the range of frequencies over which the exciter can be tuned. The other component values connected in the grid circuit of the vacuum tube amplifier 14 are selected such that they present a relatively constant impedance to the transmission line. Since the input impedance of the amplifier in the cathode-follower circuit configuration is inherently relatively large, the exciter 10 effectively works into a fixed load. Since power amplification is achieved by the vacuum tube amplifier, only a small amount of signal current is transmitted over the transmission line so that relatively small loss occurs through the transmission line. The r.m.s. value of the A.C. signal level is designated in the well-known manner by $E_I$, with reference to ground. Except for negligible loss through capacitor 18, the exciter output signal appears across the capacitive voltage divider network between the control grid and ground.

Assume that at the selected frequency the effective antenna impedance would be capacitive in nature, as represented at 54. This presents a capacitive load to the cathode circuit and is reflected back to the cathode circuit so as to cause a difference in phase between the A.C. signal current in the cathode circuit and the A.C. input signal potential applied to the control grid. Naturally, there is a substantial increase in power output effected by the vacuum tube power amplifier 14 with the proper D.C. energy potentials applied to the various electrodes. The cathode current appearing in line 36 is inductively coupled to the RF transformer 30 and at least a portion of the input signal from the capacitive voltage divider network on the grid is also coupled to RF transformer 30 via conductor 38. The phase relationship between the input signal applied to the grid and the signal appearing on the cathode is sensed by the tune sense winding 40 and applied as an input to servo amplifier 42. Any well-known type of servo amplifier can be utilized and the particular circuit configuration thereof is not considered part of this invention. Suffice it to point out that the servo amplifier responds to the phase difference of the two signals as sensed by the output winding and provides a signal output to servo motor 44 to cause it to drive in a certain direction and at a certain speed depending on the sense and magnitude of the phase difference. By mechanical linkage, such as a gear train (not shown) but indicated by the dashed line, the inductance of inductor 58 is caused to vary by the servo motor 44. In this example, since it was assumed that the effective antenna impedance was originally capacitive the servo motor would set the inductance to a higher value to balance the capacitive effect of the antenna impedance so that the load on the cathode circuit will appear as a purely resistive load.

The output winding 46 on the RF transformer 32 senses the magnitude of the load on the cathode circuit. The swing of the A.C. current signal in conductor 36 is inductively coupled to the core of RF transformer 32 and varies in accordance with the load on the cathode circuit. If the load is above a predetermined level, a signal is fed to the servo amplifier 48 to cause it to drive servo motor 50 in a direction to change the capacitance of capacitor 34 to reduce the load to the predetermined level. Since any variations in capacitor 34 do affect the reactance of the cathode circuit, there is caused a change in the phase relationship of the input and output signals. This is again sensed by the output winding of RF transformer 30 and is compensated for by the resetting of variable inductance 58 via servo amplifier 42 and servo motor 44. Although it is a capacitor that is varied in changing the load, the corresponding compensating effect by the coupler tuning circuit effectively makes it a variation of resistive component. The particular circuit configuration for the servo amplifier 48 is, similar to that for servo amplifier 42, well-known in the art and is not considered part of this invention. Suffice it to point out that it must have a null point corresponding to the desired load setting and any variation above or below this null point will result in a corresponding change in the capacity of capacitor 34 to effectively balance out and reset the load to the proper value. This null point is selected such that when the inductance 58 has been properly set, the impedance of the load as seen by the cathode circuit will be substantially equal to the effective internal impedance of the cathode circuit so as to effect maximum power transfer from the cathode to the antenna. It should be noted that although a variable inductor is shown in the tuning circuit coupling the cathode to the antenna, obviously a capacitor or combination capacitor and inductor in series or series parallel arrangement could be equally utilized.

Figure 2:
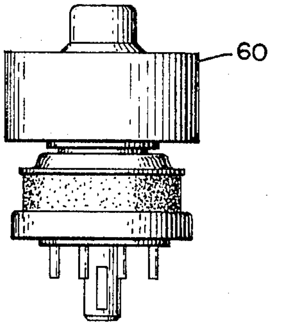
FIG. 2 illustrates the preferred construction of the vacuum tube amplifier used in the circuit of FIG. 1.
Figure 3:
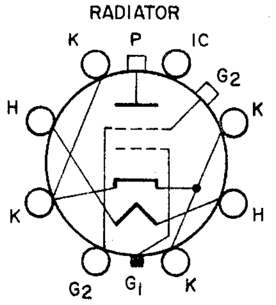
FIG. 3 illustrates the electrode connections of the amplifier shown in FIG. 2.

FIGS. 2 and 3 illustrate a vacuum tube particularly adaptable for use in the instant invention. FIG. 2 is a front view and FIG. 3 shows the connections for the tube electrodes. Typically, this tube may be of the type manufactured by RCA and designated 7203/4CX250B which is a small, compact, forced-air-cooled, beam-power tube constructed with ceramic-metal seals. The metallic radiator 60 which serves as at least part of the outer casing of the vacuum tube is brazed (not shown) to the plate or anode. This provides a heat sink for dissipation of excessive temperature on the anode. The implementation of this tube structure into the cathode follower circuit configuration, as schematically illustrated in FIG. 1, provides the advantageous feature allowing the radiator to be directly strapped, by means not shown, to a further heat sink which may be the equipment casing. With the novel circuit arrangement of placing the cathode at the high negative potential level and operating the anode at the ground reference potential level the danger of high voltage on the outer casing is removed.

Figure 4:
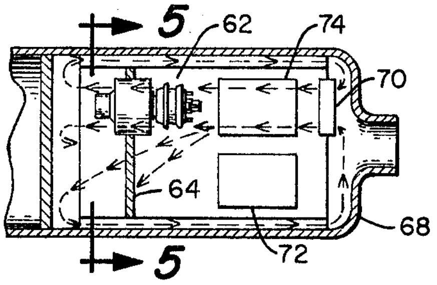
FIGS. 4 and 5 illustrate a packaging arrangement of the circuit of FIG. 1.
Figure 5:
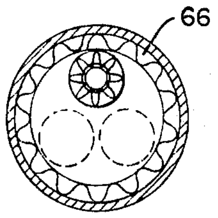

FIG. 4 is a partially cross-sectioned view of an embodiment of this invention in a particular packaging arrangement. FIG. 5 is a cutaway side view of FIG. 4. The power amplifier tube 62, or tubes if additional amplification is required, are mounted in a circular base member 64 having undulations, indicated at 66, along its peripheral edge. This is mounted within a cylindrical casing member 68 which in turn may be attached to the bulkhead of the aircraft. There is further located within the casing member a fan 70 for directing air toward the vacuum tubes to cause air to flow through the vanes for cooling purposes. The arrows designate the air-flow path. Preferably, the variable inductor in coil form, indicated at 74 is also placed in the air-flow path since it may be operating at a relatively high temperature. Although in general the variable capacitor indicated at 72 need not be cooled by forced air, in order to compact the packaging it can also be included within the casing member. Of course, the servo motors and the mechanical linkages for positioning and setting the variable inductor and the variable capacitor must be coupled to their respective elements and, depending upon the size and the space availability within the cylindrical casing unit, may be located therein. Additionally, the electrical interconnections between the circuits, such as the input conductor from the transmitter, an output line to the antenna and the D.C. potential lines, must also be provided although they are not shown in the figure. The recirculating air maintains the vacuum tubes within their rated temperature capabilities. Obviously, other packaging configurations can be implemented within the teachings of this invention and the particular one shown in FIG. 4 is intended to be illustrative and not limitative.

It is understood that suitable modifications may be made in structure as disclosed provided such modifications come within the spirit and scope of the appended claims. Having now, therefore, fully illustrated and described our invention, what we claim to be new and desire to protect by Letters Patent is:

An impedance matching system for coupling the output signal of an RF transmitter to an antenna comprising:
- an RF transmitter comprising an exciter for providing an output signal;
- a cathode follower power amplifier located remote from said transmitter for amplifying said exciter output signal, said cathode-follower comprising:
  - an anode coupled to ground,
  - a control grid coupled to said exciter for receiving said exciter output signal and
  - a cathode for providing an amplified exciter output signal;
- an antenna for transmitting said amplified exciter output signal located in close proximity to said cathode follower;
- first variable reactance means coupled to said cathode and to said antenna;
- second variable reactance means coupled to said cathode and to ground;
- a phase detector coupled to said cathode and said control grid for detecting a phase difference between said exciter output signal and said amplified exciter output signal;
- first means coupled to said phase detector and said first variable reactance for automatically varying said first variable reactance to provide maximum antenna power output;
- load sensing means coupled to said cathode for sensing the load on said cathode; and
- second means coupled to said load sensing means and said second variable reactance for automatically varying said second variable reactance to provide maximum antenna power output.

References Cited by the Examiner

UNITED STATES PATENTS

| | | | |
|---|---|---|---|
| 2,314,132 | 3/1943 | Doherty | 330—193 X |
| 2,376,667 | 5/1945 | Cunningham et al. | 325—177 |
| 2,745,067 | 5/1956 | True et al. | 325—174 |
| 2,988,705 | 6/1961 | Schwittek | 330—194 |
| 3,074,024 | 1/1963 | Weidknecht | 330—193 |

DAVID G. REDINBAUGH, *Primary Examiner.*

B. V. SAFOUREK, *Assistant Examiner.*